United States Patent
Son et al.

(10) Patent No.: US 10,312,502 B2
(45) Date of Patent: Jun. 4, 2019

(54) LITHIUM ELECTRODE AND LITHIUM SECONDARY BATTERY COMPRISING SAME

(71) Applicant: LG CHEM, LTD., Seoul (KR)

(72) Inventors: Byoungkuk Son, Daejeon (KR); Minchul Jang, Daejeon (KR); Kiyoung Kwon, Daejeon (KR); Seong Ho Lee, Daejeon (KR); Intae Park, Daejeon (KR); Changhun Park, Daejeon (KR); Junghun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 157 days.

(21) Appl. No.: 15/315,818

(22) PCT Filed: Jun. 15, 2015

(86) PCT No.: PCT/KR2015/006024
§ 371 (c)(1),
(2) Date: Dec. 2, 2016

(87) PCT Pub. No.: WO2015/190898
PCT Pub. Date: Dec. 17, 2015

(65) Prior Publication Data
US 2017/0104209 A1    Apr. 13, 2017

(30) Foreign Application Priority Data

Jun. 13, 2014 (KR) .......... 10-2014-0072201
Jun. 13, 2014 (KR) .......... 10-2014-0072205
Jun. 13, 2014 (KR) .......... 10-2014-0072249

(51) Int. Cl.
*H01M 4/133* (2010.01)
*H01M 4/38* (2006.01)
(Continued)

(52) U.S. Cl.
CPC .......... *H01M 4/133* (2013.01); *H01M 4/382* (2013.01); *H01M 4/485* (2013.01); *H01M 4/587* (2013.01);
(Continued)

(58) Field of Classification Search
CPC .......... H01M 10/052; H01M 10/0525; H01M 10/056; H01M 10/0568; H01M 10/0569;
(Continued)

(56) References Cited

U.S. PATENT DOCUMENTS 6,528,212 B1    3/2003    Kusumoto et al.
2002/0102455 A1    8/2002    Daroux et al.
(Continued)

FOREIGN PATENT DOCUMENTS

JP    2004-134403 A    4/2004
JP    2009-76433 A    4/2009
(Continued)

OTHER PUBLICATIONS

Dolle' et al., "Live Scanning Electron Microscope Observations of Dendritic Growth in Lithium/Polymer Cells", ECS, 2002, 5, (12), pp. A286-A289.
(Continued)

*Primary Examiner* — Carlos Barcena
(74) *Attorney, Agent, or Firm* — Birch, Stewart, Kolasch & Birch, LLP

(57) ABSTRACT

A lithium electrode including a porous carbon body; and a lithium metal inserted into pores of the porous carbon body is provided. The lithium electrode may include a lithium ion conductive protective layer formed on at least one surface of the porous carbon body. The lithium electrode can be used as a negative electrode in a lithium secondary battery.

17 Claims, 4 Drawing Sheets

(51) Int. Cl.
  *H01M 10/0568* (2010.01)
  *H01M 10/0569* (2010.01)
  *H01M 10/0525* (2010.01)
  *H01M 4/485* (2010.01)
  *H01M 4/587* (2010.01)
  *H01M 10/052* (2010.01)
  *H01M 10/056* (2010.01)

(52) U.S. Cl.
  CPC ....... *H01M 10/052* (2013.01); *H01M 10/056* (2013.01); *H01M 10/0525* (2013.01); *H01M 10/0568* (2013.01); *H01M 10/0569* (2013.01); *H01M 2300/0025* (2013.01); *Y02E 60/122* (2013.01); *Y02T 10/7011* (2013.01)

(58) Field of Classification Search
  CPC ......... H01M 2300/0025; H01M 4/133; H01M 4/382; H01M 4/485; H01M 4/587
  See application file for complete search history.

(56) References Cited

U.S. PATENT DOCUMENTS

| | | |
|---|---|---|
| 2002/0187401 A1 | 12/2002 | Lee et al. |
| 2004/0072066 A1 | 4/2004 | Cho et al. |
| 2004/0209159 A1 | 10/2004 | Lee et al. |
| 2005/0095504 A1 | 5/2005 | Kim et al. |
| 2005/0196677 A1 | 9/2005 | Lee et al. |
| 2007/0065719 A1 | 3/2007 | Timonov et al. |
| 2009/0061325 A1 | 3/2009 | Odani et al. |
| 2009/0148773 A1* | 6/2009 | Volkov .................. H01M 4/043 429/231.5 |
| 2010/0178545 A1 | 7/2010 | Pan et al. |
| 2012/0276459 A1 | 11/2012 | Im et al. |
| 2013/0029249 A1 | 1/2013 | Hamrock et al. |
| 2013/0130115 A1 | 5/2013 | Park et al. |
| 2014/0205917 A1* | 7/2014 | Mizuno ............... H01M 12/065 429/405 |
| 2016/0056501 A1 | 2/2016 | Ryu et al. |
| 2016/0233475 A1 | 8/2016 | Son et al. |

FOREIGN PATENT DOCUMENTS

| | | |
|---|---|---|
| JP | 2011-174032 A | 9/2011 |
| JP | 2013-114882 A | 6/2013 |
| KR | 10-1999-004383 A | 1/1999 |
| KR | 2002-0013634 A | 2/2002 |
| KR | 10-2004-0090561 A | 10/2004 |
| KR | 10-2005-0041661 A | 5/2005 |
| KR | 10-2006-0026203 A | 3/2006 |
| KR | 10-2009-0118089 A | 11/2009 |
| KR | 10-2012-0122674 A | 11/2012 |
| KR | 10-2013-0056668 A | 5/2013 |
| KR | 10-2013-0098234 A | 9/2013 |
| KR | 10-2013-0123142 A | 11/2013 |
| KR | 10-2014-0018052 A | 2/2014 |
| KR | 10-2015-0045361 A | 4/2015 |
| WO | WO 2014/021691 A1 | 2/2014 |

OTHER PUBLICATIONS

International Search Report, issued in PCT/JP2015/006021 (PCT/ISA/210), dated Oct. 5, 2015.
International Search Report, issued in PCT/KR2015/006024 (PCT/ISA/210), dated Oct. 5, 2015.
European Search Report for Appl. No. 15806481.6 dated Jan. 30, 2018.
U.S. Office Action for U.S. Appl. No. 15/318,301, dated Nov. 16, 2018.
Japanese Office Action in Application No. 2016-571397 dated Jan. 11, 2019.

* cited by examiner

[FIG. 1]
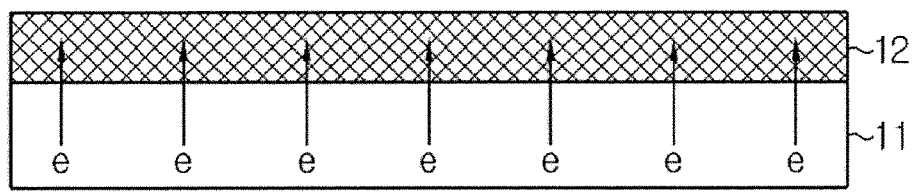
[FIG. 2]
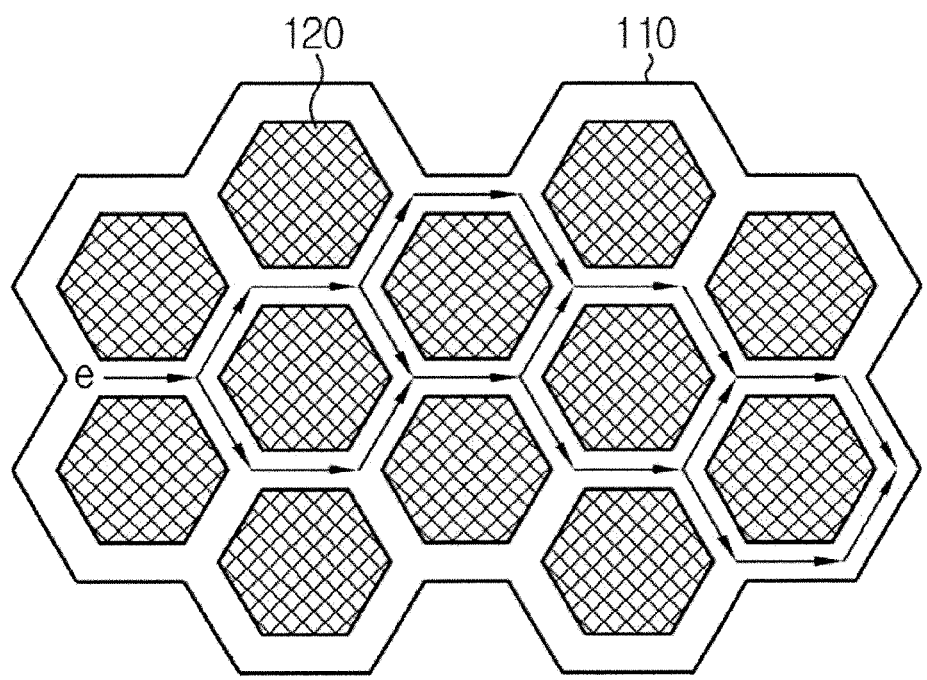

[FIG. 3]
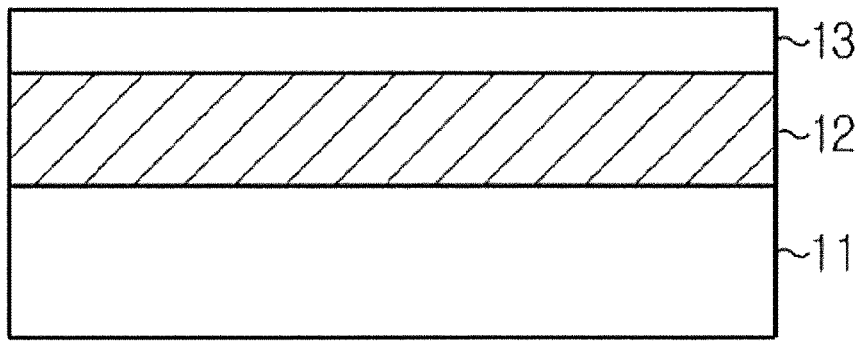
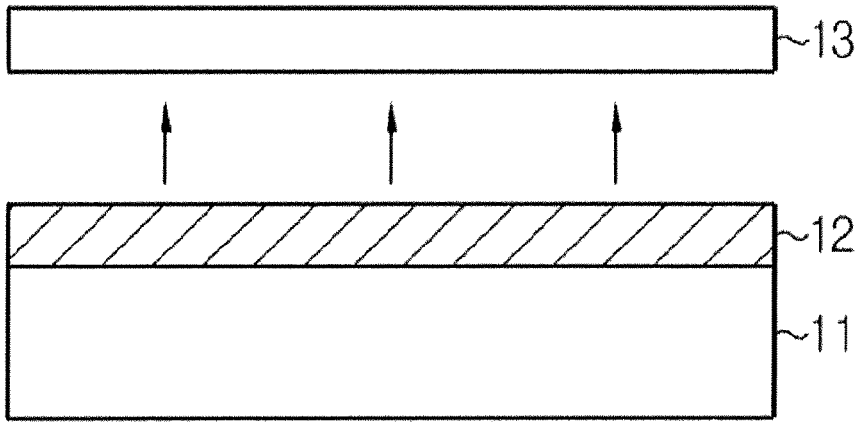

[FIG. 4]
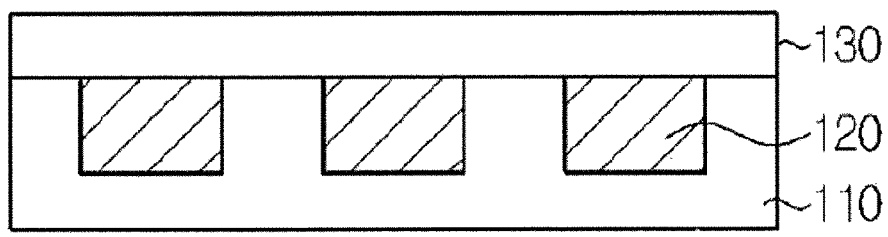
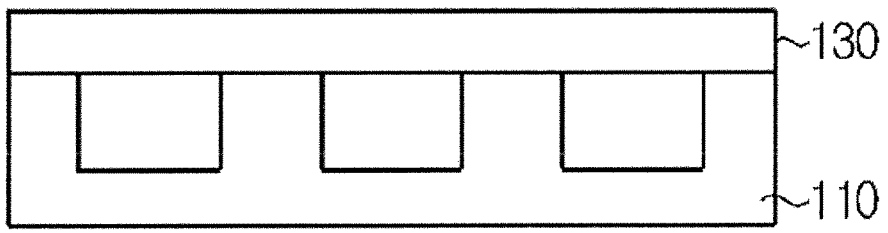

[FIG. 5]
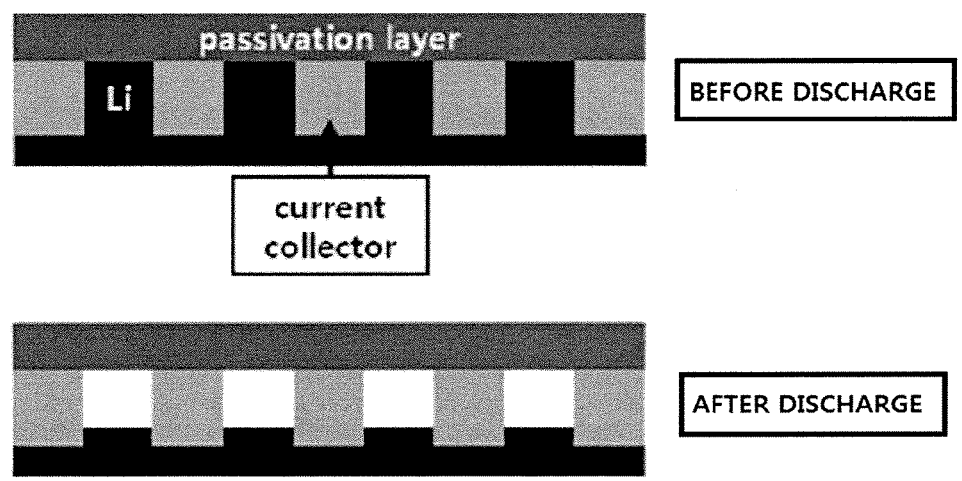

LITHIUM ELECTRODE AND LITHIUM SECONDARY BATTERY COMPRISING SAME

TECHNICAL FIELD

This application claims priority to and the benefit of Korean Patent Application Nos. 10-2014-0072205, 10-2014-0072201, and 10-2014-0072249 filed in the Korean Intellectual Property Office on Jun. 13, 2014, the entire contents of which are incorporated herein by reference.

The present application relates to a lithium electrode and a lithium secondary battery including the same.

BACKGROUND ART

Recently, interests in energy storage technology have been gradually increased. As the application field of energy storage technology is enlarged to energy for cellular phones, camcorders, notebook computers and electric vehicles, efforts on the research and development of electrochemical devices are increasingly embodied. In this aspect, the field of electrochemical devices have received the majority of attention, and among them, interests in the development of chargeable/dischargeable secondary batteries are focused. Recently, in order to increase the capacity density and specific energy in developing such batteries, research and development for the design of new electrodes and batteries have been conducted.

Among secondary batteries which are currently applied, lithium secondary batteries developed in the early 1990s are in the spotlight due to the advantages of higher operation voltages and far greater energy densities than those of conventional batteries, such as Ni—MH, Ni—Cd and sulfuric acid-lead batteries, which use an aqueous electrolyte solution.

In general, lithium secondary batteries are constructed by embedding an electrode assembly including a positive electrode, a negative electrode, and a separator interposed between the positive electrode and the negative electrode in the form of a stacked or wound structure in a battery case and injecting an electrolyte therein.

In this case, when a lithium electrode is used as the negative electrode, the lithium electrode formed by attaching a lithium foil on a planar current collector has been generally used.

FIG. 1 is a view illustrating electron transfer pathways in a lithium electrode prepared by attaching a lithium foil on a planar current collector in the related art.

If the above-described general lithium electrode 10 is described with reference to FIG. 1, when a battery is driven, electrons being transferred to a lithium foil 12 through a current collector 11 are transferred in a unidirectional flow. For this reason, electron density on lithium surface becomes non-uniform, and accordingly, lithium dendrites may be formed.

These lithium dendrites may finally cause damage to the separator and may generate a short circuit in the lithium secondary battery, and as a result, there may occur a problem in that the safety of the lithium battery deteriorates.

DETAILED DESCRIPTION OF THE INVENTION

Technical Problem

The present application has been made in an effort to provide a lithium electrode and a lithium secondary battery including the same.

Technical Solution

In order to solve the problem, the present application provides a lithium electrode including: a porous carbon body; and a lithium metal inserted into pores of the porous carbon body.

Further, the present application provides a lithium secondary battery including a positive electrode, a negative electrode, and an electrolyte, in which the negative electrode is the lithium electrode.

Advantageous Effects

According to an exemplary embodiment of the present application, a contact surface area between a lithium metal and a porous carbon body may be increased to improve the performance of a lithium secondary battery.

According to an exemplary embodiment of the present application, the performance of the lithium secondary battery may be improved by a porous carbon body, which is lightweight and has a high energy density per unit weight.

According to an exemplary embodiment of the present application, the safety of a lithium secondary battery may be improved by having a porous carbon body to prevent lithium dendrites from being grown through the uniformization of electron distribution in the lithium electrode when the lithium secondary battery is driven.

According to an exemplary embodiment of the present application, even when a lithium ion conductive protective layer, which prevents lithium dendrites from being formed by the porous carbon body, is provided on the surface of the electrode, it is possible to prevent a phenomenon in which the protective layer is peeled off during the charge and discharge of the battery.

BRIEF DESCRIPTION OF DRAWINGS

FIG. 1 illustrates electron transfer pathways in a lithium electrode in the related art.

FIG. 2 illustrates electron transfer pathways in a lithium electrode according to an exemplary embodiment of the present application.

FIG. 3 is a view schematically illustrating the states before and after discharge of a lithium electrode including a protective layer in the related art.

FIG. 4 is a view schematically illustrating the states before and after discharge of a lithium electrode including a protective layer according to an exemplary embodiment of the present application.

FIG. 5 is a view schematically illustrating the states before and after discharge of a lithium electrode including a protective layer according to an exemplary embodiment of the present application.

BEST MODE

Hereinafter, the present application will be described in detail.

The present application provides a lithium electrode including: a porous carbon body; and a lithium metal inserted into pores of the porous carbon body.

For example, FIG. 2 illustrates electron transfer pathways in a lithium electrode prepared according to an exemplary embodiment of the present application. According to FIG. 2, a lithium electrode 100 includes: a porous carbon body 110; and a lithium metal 120 inserted into pores of the carbon body 110.

A lithium electrode in the related art is prepared by attaching a lithium foil on a planar current collector. In this case, since electrons being transferred to the lithium foil through the planar current collector are transferred in a unidirectional flow when a battery is driven, the electron density may be non-uniform on the surface of the lithium foil, and accordingly, lithium dendrites may be formed. These lithium dendrites may cause damage to a separator and may generate a short circuit in a battery, which is problematic. For example, FIG. 1 illustrates electron transfer pathways in a lithium electrode in the related art. According to FIG. 1, a lithium foil 12 is attached on a current collector 11 to form a lithium electrode 10. Accordingly, electrons are transferred from the current collector 11 to the lithium foil 12 in a unidirectional flow.

However, the lithium electrode 100 according to an exemplary embodiment of the present application has a structure in which the lithium metal 120 is inserted into pores of the porous carbon body 100, and a contact area between the lithium metal acting as an electrode active material and the porous carbon body is increased to make the electron distribution on the surface of the lithium metal uniform. From this, the performance of the lithium secondary battery may be improved, and the safety of the lithium secondary battery may be improved by preventing lithium dendrites from being grown.

According to an exemplary embodiment of the present application, as a method of inserting the lithium metal into pores of the porous carbon body, it is possible to use a method of placing a lithium foil on the porous carbon body, and then applying pressure by a roll press and the like to insert the lithium foil into pores, or a method of melting the lithium metal, and then injecting the molten metal between pores. Furthermore, the lithium electrode may be prepared by preparing a slurry using a mixture of a carbon powder, which forms the porous carbon body, and a lithium metal powder, and then coating the slurry on a base material. In this case, in the coating, comma coating, bar coating, slot die coating, and the like may be used. However, the method of inserting the lithium metal into pores of the porous carbon body may be modified or added depending on the need of the person skilled in the art, and is not limited thereto.

According to an exemplary embodiment of the present application, the content of the lithium metal may be 1 to 80 wt %, specifically 40 to 60 wt %, based on the total weight of the porous carbon body and the lithium metal. When the content of the lithium metal is within the range, lithium dendrites may be suppressed from being grown to prevent a short circuit from being generated even though continuous charge and discharge of 100 cycles or more are performed.

According to an exemplary embodiment of the present application, the porous carbon body may include at least one selected from activated carbon, graphite, graphene, carbon nanotubes (CNTs), carbon fiber, carbon black, and carbon aerosol, but may be used without being limited depending on the need of the person skilled in the art as long as the porous carbon body is a porous carbon-based material.

According to an exemplary embodiment of the present application, the porous carbon body may be in the form of mesh, foam, paper, and the like, but the form is not limited thereto.

Since a carbon-based material is lighter in weight than typical metals, in a lithium metal according to an exemplary embodiment of the present application, the performance of the lithium secondary battery may be improved by a porous carbon body, which has a high energy density per unit weight.

The higher porosity the carbon body has and the smaller the size of pores is, the better the effect of suppressing lithium dendrite from being grown is.

According to an exemplary embodiment of the present application, the porous carbon body may have a porosity of 50 to 99%, specifically 60 to 90%. When the porosity of the porous carbon body is within the range, the surface area of lithium to be inserted may be maximized while having high durability and processability of the porous carbon body.

According to an exemplary embodiment of the present application, the porosity may be calculated by (the actual weight of a porous carbon body)/(the measured volume*theoretical density of the porous carbon body).

In the present specification, the 'porosity' of the porous carbon body means a ratio of a volume occupied by pores to a total volume of the porous carbon body, and may also be expressed as a 'pore rate'.

According to an exemplary embodiment of the present application, the pores of the porous carbon body may have an average particle diameter of 5 to 500 μm, specifically 10 to 100 μm. When the average particle diameter of the pores of the porous carbon body is within the range, the surface area of lithium to be inserted may be maximized while having high durability and processability of the porous carbon body.

According to an exemplary embodiment of the present application, the porous carbon body may have a thickness of 200 μm or less. Specifically, the porous carbon body may have a thickness of 150 μm or less.

According to an exemplary embodiment of the present application, the porous carbon body may have a thickness of 10 μm or more. Specifically, the porous carbon body may have a thickness of 50 μm or more.

When the thickness of the porous carbon body is within the range, there is an effect of improving the performance of the battery because the energy density per the volume of the battery is increased, and it is appropriate to apply to the battery.

When a lightweight porous carbon body is used, there is an effect of increasing the energy density per weight in the battery because the weight of a current collector is decreased by about 70% than the weight of another metal current collector generally used. Further, since a porous carbon body is more advantageous than another metal current collector when a thickness of 250 μm or less is formed in the process, there is an effect of enhancing the efficiency on the process.

An exemplary embodiment of the present application may further include a lithium ion conductive protective layer formed on at least one surface of the lithium electrode.

A lithium electrode including a protective layer in the related art was prepared by attaching a lithium foil on a planar current collector, and a protective layer was formed on the lithium foil in order to prevent lithium dendrites. However, there was a problem in that the protective layer was peeled off depending on the change in volume of an electrode during the charge and discharge.

For example, FIG. 3 is a view schematically illustrating the states before and after discharge of a lithium electrode prepared by attaching a lithium foil on a current collector in the related art. According to FIG. 3, in the lithium electrode 10 including a protective layer in the related art, the lithium foil 12 was attached on the current collector 11, and a lithium ion conductive protective layer 13 was formed on the upper surface of the lithium foil 12 in order to prevent lithium dendrites from being formed. However, there was a problem in that the volume of the electrode is changed depending on the decrease or increase in lithium during the charge and discharge of the battery, and accordingly, the lithium ion conductive protective layer 13 is peeled off.

FIG. 4 is a view schematically illustrating the states before and after discharge of a lithium electrode including a protective layer according to an exemplary embodiment of the present application. In order to solve the problem, the present application uses a porous carbon body as a current collector. According to FIG. 4, a lithium electrode 101 including a protective layer according to an exemplary embodiment of the present application includes: an electrode composite including a porous carbon body 110 and a lithium metal 120 inserted into pores of the porous carbon body 110; and a lithium ion conductive protective layer 130 formed on at least one surface of the electrode composite.

The lithium electrode 101 including the protective layer according to an exemplary embodiment of the present application has a structure in which the lithium metal 120 is inserted into pores of the porous carbon body 100, and a contact area between the lithium metal acting as an electrode active material and the porous carbon body is increased to make the electron distribution on the surface of the lithium metal uniform, and lithium dendrites may be suppressed from being grown by the protective layer. In addition, the lithium electrode 101 including the protective layer according to an exemplary embodiment of the present application has little change in volume of the electrode depending on the decrease or increase of lithium during the charge and discharge of the battery because the porous carbon body 110 is brought into direct contact with the lithium ion conductive protective layer 130, and accordingly, there does not occur a peeling-off phenomenon of the protective layer which has been a problem when a protective layer is formed, and the safety and performance of the lithium secondary battery may be further improved.

Further, FIG. 5 is a view schematically illustrating the states before and after discharge of a lithium electrode including a protective layer according to an exemplary embodiment of the present application.

According to FIG. 5, it can be confirmed that even though the lithium is located on only the lower portion of the porous carbon body due to the decrease in lithium during the discharge, the protective layer is attached to the porous carbon body. Therefore, the lithium electrode according to an exemplary embodiment of the present application may prevent the peeling-off of the protective layer according to the discharge.

Further, the lithium ion conductive protective layer may take the place of a role of a separation membrane.

According to an exemplary embodiment of the present application, the lithium ion conductive protective layer may use a material having a lithium ion conductivity of $10^{-7}$ S/cm or more.

According to an exemplary embodiment of the present application, the lithium ion conductive protective layer may include at least one selected from inorganic compounds and organic compounds.

According to an exemplary embodiment of the present application, the inorganic compound may be any one or a mixture of two or more selected from a group consisting of LiPON, hydride-based compounds, thio-LISICON-based compounds, NASICON-based compounds, LISICON-based compounds, and Perovskite-based compounds.

According to an exemplary embodiment of the present application, the hydride-based compound may be $LiBH_4$—LI, $Li_3N$, $Li_2NH$, $Li_2BNH_6$, $Li_{1.8}N_{0.4}Cl_{0.6}$, $LiBH_4$, $Li_3P$—LiCl, $Li_4SiO_4$, $Li_3PS_4$, or $Li_3SiS_4$, but is not limited thereto.

According to an exemplary embodiment of the present application, the thio-LISICON-based compound may be $Li_{10}GeP_2S_{12}$, $Li_{3.25}Ge_{0.25}P_{0.75}S_4$, or $Li_2S$—$GeS$—$Ga_2S_3$, but is not limited thereto.

According to an exemplary embodiment of the present application, the NASICON-based compound may be $Li_{1.3}Al_{0.3}Ge_{1.7}(PO_4)_3$, $Li_{1.3}Al_{0.3}Ti_{1.7}(PO_4)_3$, or $LiTi_{0.5}Zr_{1.6}(PO_4)_3$, but is not limited thereto.

According to an exemplary embodiment of the present application, the LISICON-based compound may be $Li_{14}Zn(GeO_4)_4$, but is not limited thereto.

According to an exemplary embodiment of the present application, the Perovskite-based compound may be $Li_xLa_{1-x}TiO_3(0<x<1)$ or $Li_7La_3Zr_2O_{12}$, and specifically, may be $Li_{0.35}La_{0.55}TiO_3$, $Li_{0.5}La_{0.5}TiO_3$, or $Li_7La_3Zr_2O_{12}$, but is not limited thereto.

According to an exemplary embodiment of the present application, the organic compound may be selected from polyethylene oxide (PEO); polyacrylonitrile (PAN); polymethylmethacrylate (PMMA); polyvinylidene fluoride (PVDF); and a polymer including —$SO_3Li$, —COOLi, or —OLi.

According to an exemplary embodiment of the present application, the polymer including —$SO_3Li$, —COOLi, or —OLi is a polymer which may transfer lithium ions, and may include a copolymer including a repeating unit of the following Chemical Formula A and a repeating unit of the following Chemical Formula B.

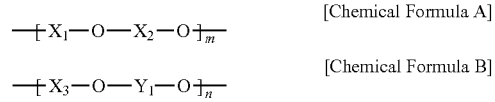

[Chemical Formula A]

[Chemical Formula B]

In Chemical Formulae A and B,
m and n mean the number of repeating units,
$1 \leq m \leq 500$, and $1 \leq n \leq 500$,
$X_1$, $X_2$, and $X_3$ are the same as or different from each other, and are each independently represented by any one of the following Chemical Formulae 1 to 3,

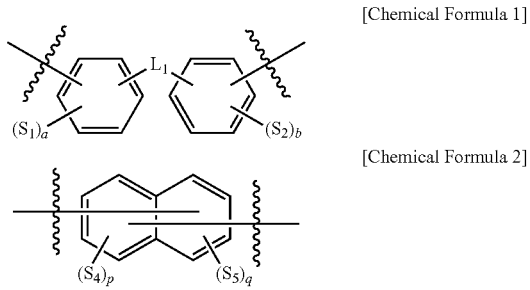

[Chemical Formula 1]

[Chemical Formula 2]

-continued

[Chemical Formula 3]

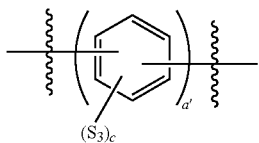

In Chemical Formulae 1 to 3, $L_1$ is a direct bond, or any one of —$CZ_2Z_3$—, —CO—, —O—, —S—, —$SO_2$—, —$SiZ_2Z_3$—, and a substituted or unsubstituted divalent fluorene group, $Z_2$ and $Z_3$ are the same as or different from each other, and are each independently any one of hydrogen, an alkyl group, a trifluoromethyl group (—$CF_3$), and a phenyl group, $S_1$ to $S_5$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group, a, b, c, p, and q are the same as or different from each other, and are each independently an integer of 0 or more and 4 or less, p+q≤6, a' is an integer of 1 or more and 5 or less, in Chemical Formula B, $Y_1$ is represented by any one of the following Chemical Formulae 4 to 6,

[Chemical Formula 4]

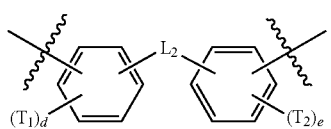

[Chemical Formula 5]

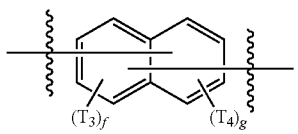

[Chemical Formula 6]

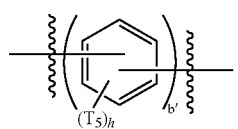

in Chemical Formulae 4 to 6, $L_2$ is a direct bond, or any one selected from —CO—, —$SO_2$—, and a substituted or unsubstituted divalent fluorene group, d, e, f, g, and h are the same as or different from each other, and are each independently an integer of 0 or more and 4 or less, f+g≤6 and b' is an integer of 1 or more and 5 or less, and $T_1$ to $T_5$ are the same as or different from each other, and each independently, at least one is —$SO_3Li$, —COOLi, or —OLi, and the others are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group.

In the present specification,

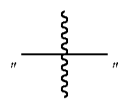

represents a position which may be bonded to an adjacent substituent.

Examples of the substituents will be described below, but are not limited thereto.

In the present specification, examples of the halogen group include fluorine, chlorine, bromine or iodine.

In the present specification, the alkyl group may be straight-chained or branch-chained, and the number of carbon atoms thereof is not particularly limited, but it is preferred that the number is 1 to 60, specifically 1 to 40, and more specifically 1 to 20. Specific examples thereof include a methyl group, an ethyl group, a propyl group, an isopropyl group, a butyl group, a t-butyl group, a pentyl group, a hexyl group, a heptyl group, and the like, but are not limited thereto.

In the present specification, the alkenyl group may be straight-chained or branch-chained, and the number of carbon atoms thereof is not particularly limited, but it is preferred that the number is 2 to 60, specifically 2 to 40, and more specifically 2 to 20.

In the present specification, the alkoxy group may be straight-chained or branch-chained, and the number of carbon atoms thereof is not particularly limited, but it is preferred that the number is 1 to 60, specifically 1 to 40, and more specifically 1 to 20.

In the present specification, the cycloalkyl group is not particularly limited, but it is preferred that the number of carbon atoms thereof is 3 to 60, specifically 3 to 40, and more specifically 5 to 20, and particularly, a cyclopentyl group and a cyclohexyl group are preferred.

In the present specification, the heterocycloalkyl group includes one or more of S, O, and N and is not particularly limited, but it is preferred that the number of carbon atoms thereof is 2 to 60, specifically 2 to 40, and more specifically 3 to 20, and particularly, a cyclopentyl group and a cyclohexyl group are preferred.

In the present specification, the number of carbon atoms of the amine group is not particularly limited, but it is preferred that the number is 1 to 60, specifically 1 to 40, and more specifically 1 to 20. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a phenylnaphthylamine group, a ditolylamine group, a phenyltolylamine group, a triphenylamine group, and the like, but are not limited thereto.

In the present specification, the aryl group may be monocyclic or polycyclic, and the number of carbon atoms thereof is not particularly limited, but it is preferred that the number is 6 to 60, specifically 6 to 40, and more specifically 6 to 20. Specific examples of the aryl group include a monocyclic aromatic group, such as a phenyl group, a biphenyl group, a triphenyl group, a terphenyl group, and a stilbene group, and a polycyclic aromatic group, such as a naphthyl group, a binaphthyl group, an anthracenyl group, a phenanthrenyl group, a pyrenyl group, a perylenyl group, a tetracenyl group, a chrysenyl group, a fluorenyl group, an acenaphthacenyl group, a triphenylene group, and a fluoranthene group, and the like, but are not limited thereto.

In the present specification, the heteroaryl group includes one or more of S, O, and N as a heteroatom, and the number of carbon atoms thereof is not particularly limited, and it is preferred that the number is 2 to 60, specifically 2 to 40, and more specifically 3 to 20. Specific examples of the heteroaryl include pyridyl, pyrrolyl, pyrimidyl, pyridazinyl, furanyl, thienyl, imidazolyl, pyrazolyl, oxazolyl, isoxazolyl, thiazolyl, isothiazolyl, triazolyl, furazanyl, oxadiazolyl, thiadiazolyl, dithiazolyl, tetrazolyl, pyranyl, thiopyranyl, diazinyl, oxazinyl, thiazinyl, dioxynyl, triazinyl, tetrazinyl, quinolyl, isoquinolyl, quinazolinyl, isoquinazolinyl, acridinyl, phenanthridinyl, imidazopyridinyl, diazanaphthalenyl, triazaindene, indolyl, benzothiazolyl, benzoxazolyl, benzoimidazolyl, a benzothiophene group, a benzofuran group, a dibenzothiophene group, a dibenzofuran group, carbazolyl, benzocarbazolyl, phenazinyl, and the like, or fused rings thereof, but are not limited thereto.

In the present specification, the fluorenyl group may be substituted with another substituent, and substituents may combine with each other to form a ring. Examples thereof include

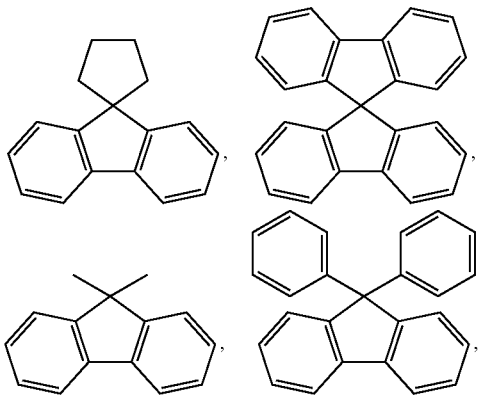

and the like.

In the present specification, the term "substituted or unsubstituted" means being unsubstituted or substituted with one or more substituents selected from a group consisting of deuterium; a halogen group; a nitrile group; a nitro group; a hydroxy group; a cyano group; straight-chained or branch-chained $C_1$ to $C_{60}$ alkyl; straight-chained or branch-chained $C_2$ to $C_{60}$ alkenyl; straight-chained or branch-chained $C_2$ to $C_{60}$ alkynyl; $C_3$ to $C_{60}$ monocyclic or polycyclic cycloalkyl; $C_2$ to $C_{60}$ monocyclic or polycyclic heterocycloalkyl; $C_6$ to $C_{60}$ monocyclic or polycyclic aryl; and $C_2$ to $C_{60}$ monocyclic or polycyclic heteroaryl, or being unsubstituted or substituted with a substituent having a structure in which two or more selected from a group consisting of the substituents above exemplified are linked. As described above, when the substituent has a structure in which two or more substituents are linked, the two or more substituents may be the same as or different from each other.

According to an exemplary embodiment of the present application, m and n may be $2 \leq m \leq 500$ and $2 \leq n \leq 500$.

According to an exemplary embodiment of the present application, the copolymer may be a block copolymer.

In an exemplary embodiment of the present application, the ratio of m and n may be 1:9 to 7:3. That is, when m+n is 1, n may have a ratio of 0.3 to 0.9.

In an exemplary embodiment of the present application, the ratio of m and n may be 2:8 to 6:4. That is, when m+n is 1, n may have a ratio of 0.4 to 0.8.

According to an exemplary embodiment of the present application, Chemical Formula 1 may be represented by the following Chemical Formula 1-1.

[Chemical Formula 1-1]

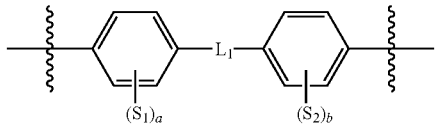

In Chemical Formula 1-1, $S_1$, $S_2$, a, b, and $L_1$ are the same as those defined in Chemical Formula 1.

According to an exemplary embodiment of the present application, Chemical Formula 4 may be represented by the following Chemical Formula 4-1.

[Chemical Formula 4-1]

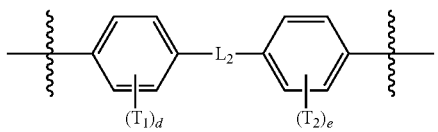

In Chemical Formula 4-1, $T_1$, $T_2$, d, e, and $L_2$ are the same as those defined in Chemical Formula 4.

According to an exemplary embodiment of the present application, in Chemical Formulae A and B, $X_1$, $X_2$, and $X_3$ are the same as or different from each other, and may be each independently any one selected from the following structural formulae.

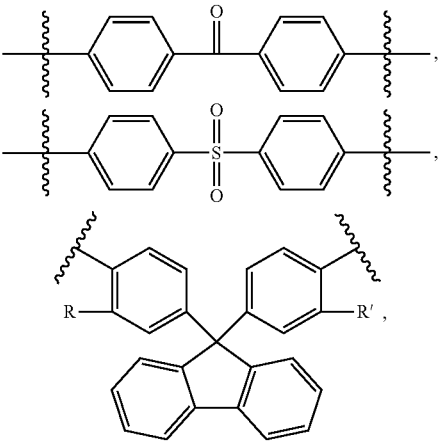

-continued

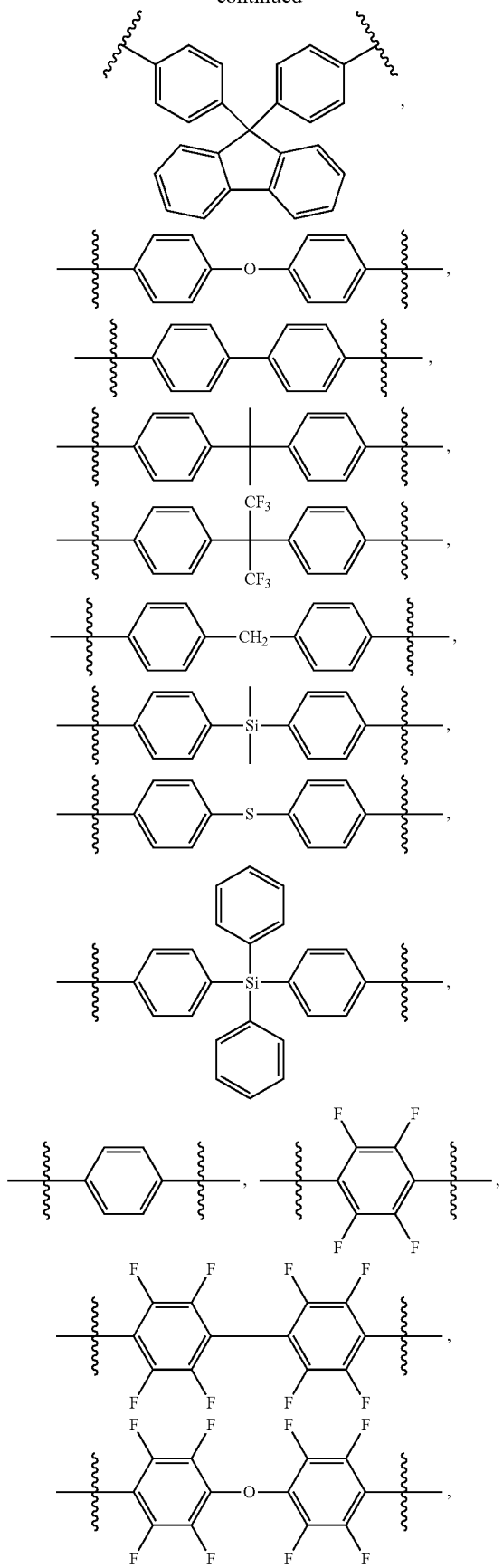

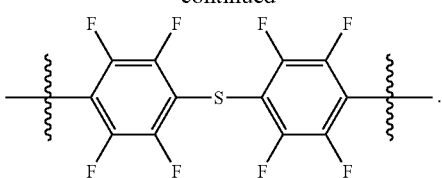

Here, R and R' are the same as or different from each other, and are each independently —$NO_2$ or —$CF_3$.

According to an exemplary embodiment of the present application, in Chemical Formulae A and B, at least one of $X_1$, $X_2$, and $X_3$ may be represented by the following Chemical Formula 11.

[Chemical Formula 11]

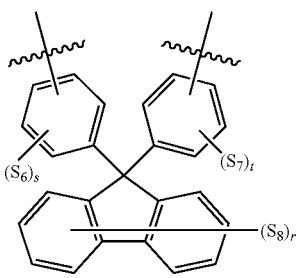

In Chemical Formula 11, $S_6$ to $S_8$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group, s and t are the same as or different from each other, and are each independently an integer of 0 or more and 4 or less, and r is an integer of 0 or more and 8 or less.

When the copolymer includes Chemical Formula 11 including a bulky fluorene group, the copolymer may improve the durability while having heat resistance and strong physical properties by a rigid aromatic skeleton, and may exhibit an effect in that lithium ions are easily transferred due to the increase in hydrodynamic volume during the entanglement of polymer chains.

According to an exemplary embodiment of the present application, in Chemical Formulae A and B, at least one of $X_1$ and $X_2$ may be represented by Chemical Formula 11.

According to an exemplary embodiment of the present application, in Chemical Formulae A and B, at least one of $X_1$, $X_2$, and $X_3$ may be

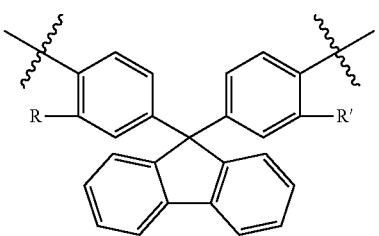

or

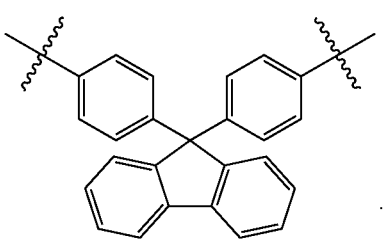 [SMILES: *c1ccc(C2(c3ccc(*)cc3)c3ccccc3-c3ccccc32)cc1]

According to an exemplary embodiment of the present application, in Chemical Formula B, $Y_1$ may be any one selected from the following structural formulae.

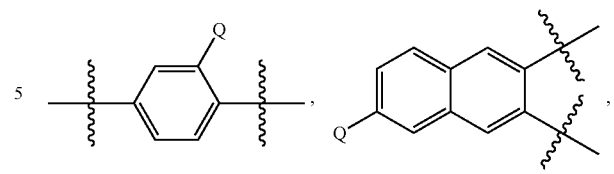

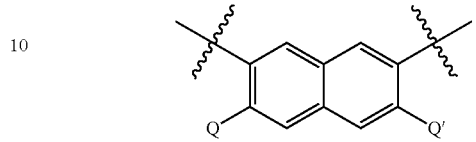

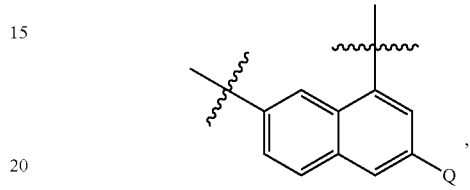

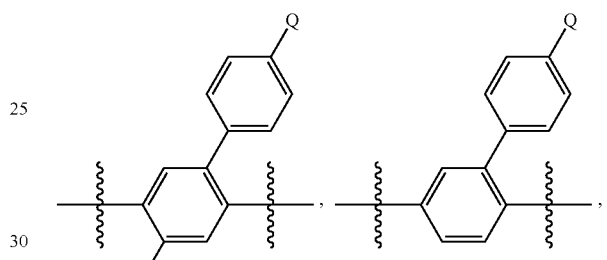

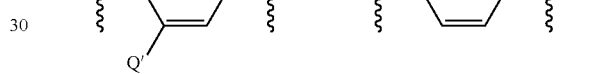

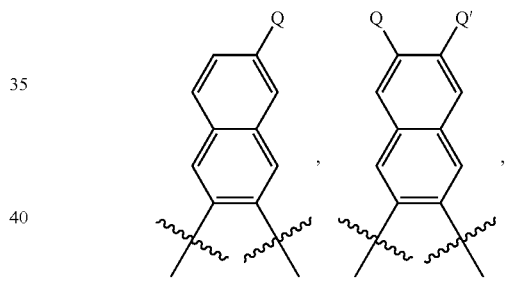

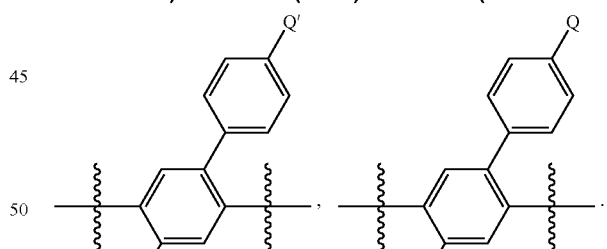

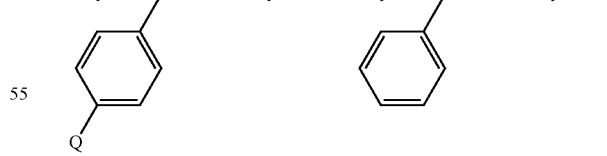

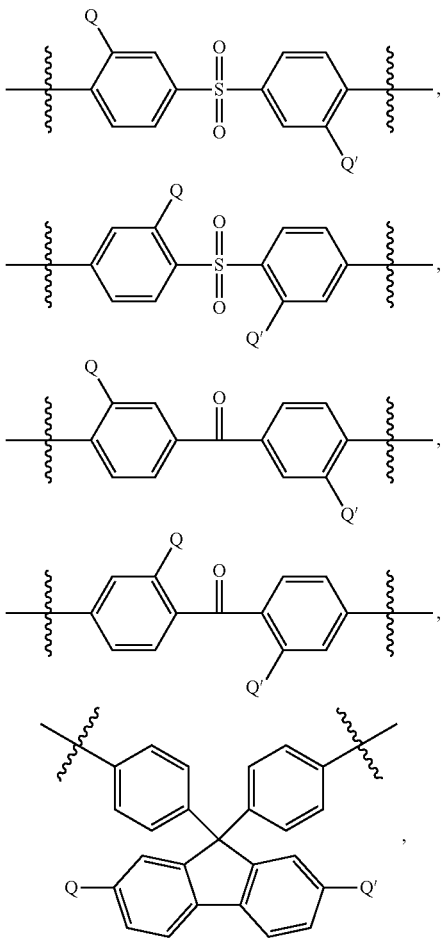

Here, Q is —SO$_3$Li, —COOLi, or —OLi, and Q' is hydrogen, —SO$_3$Li, —COOLi, or —OLi.

According to an exemplary embodiment of the present application, the copolymer may further include a repeating unit of the following Chemical Formula C.

[Chemical Formula C]

According to an exemplary embodiment of the present application, in Chemical Formula C, Z is a trivalent organic group.

According to an exemplary embodiment of the present application, the repeating unit of Chemical Formula C serves to link or cross-link polymer chains as a brancher. Depending on the number of repeating units of Chemical Formula C, a branch may be formed on the chain, or the chains may be cross-linked to each other to form a network-type structure.

According to an exemplary embodiment of the present application, in Chemical Formula C, Z is a trivalent organic group, and may be bonded to additional repeating units in each three directions to elongate the polymer chain.

According to an exemplary embodiment of the present application, the number, molecular weight, and the like of an ion transfer functional group may be adjusted and mechanical properties may be strengthened by using a brancher which is the repeating unit of Chemical Formula C.

According to an exemplary embodiment of the present application, when the number of repeating units in the repeating unit of Chemical Formula C is denoted as k, k may be an integer of 1 to 300.

According to an exemplary embodiment of the present application, the repeating unit of Chemical Formula C may be a polymer repeating unit constituting a main chain. For example, Z may be linked to at least one selected from $X_1$, $X_2$, $X_3$, and $Y_1$ to form one repeating unit. The one repeating unit formed as described above may constitute the main chain. In this case, the number of repeating units is the same as that of the above-described k.

In the present specification, when any two or more selected from Z, $X_1$, $X_2$, $X_3$, and $Y_1$ are bonded to each other, the resulting bonds each have a linking group of oxygen (—O—). The oxygen linking group is a linking group that remains in the chain after the compound evades therefrom by a condensation polymerization. For example, when a dihalogen-based monomer and a diol-based monomer are polymerized, the oxygen linking group may be a case where HF evades and only oxygen (—O—) remains in the chain.

According to an exemplary embodiment of the present application, in Chemical Formula C, Z is represented by the following Chemical Formula C-1 or C-2.

[Chemical Formula C-1]

[Chemical Formula C-2]

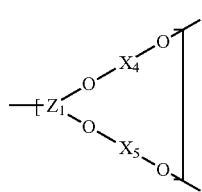

In Chemical Formulae C-1 and C-2, $Z_1$ may be represented by any one of the following Chemical Formulae 7 to 9.

[Chemical Formula 7]

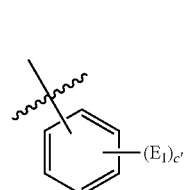

[Chemical Formula 8]

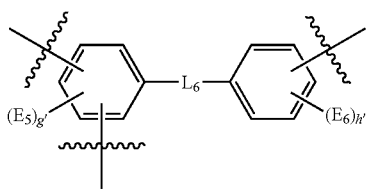

[Chemical Formula 9]

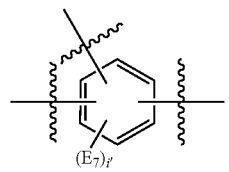

In Chemical Formulae 7 to 9, $L_3$ to $L_6$ are the same as or different from each other, and are each independently a direct bond, or —O—, —CO—, or —SO$_2$—.

$E_1$ to $E_7$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group, c', d', e', and h' are the same as or different from each other, and are each independently an integer of 0 or more and 4 or less, f', g', and i' are the same as or different from each other, and are each independently an integer of 0 or more and 3 or less, and $X_4$ and $X_5$ are the same as or different from each other, and are each independently the same as the definition of $X_3$ or $Y_1$ of Chemical Formula B.

According to an exemplary embodiment of the present application, in Chemical Formula C, Z may be any one selected from the following structural formulae.

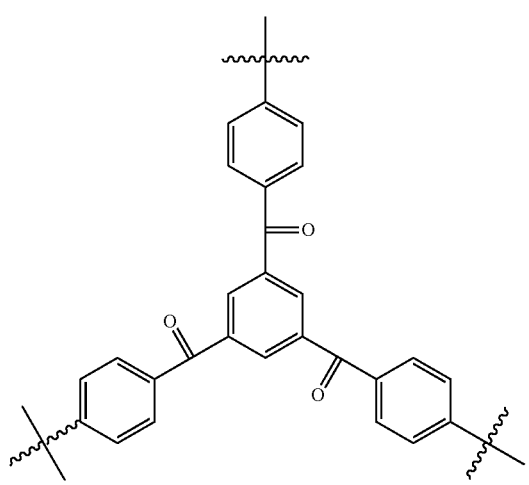
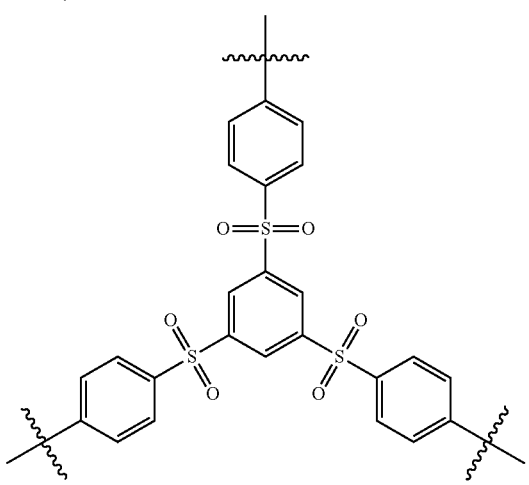
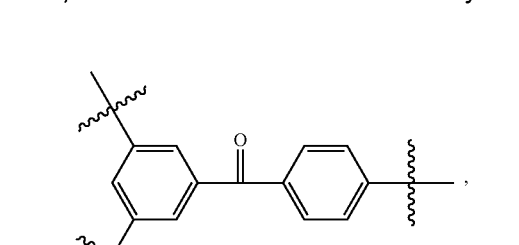
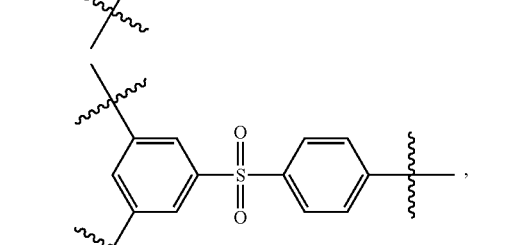
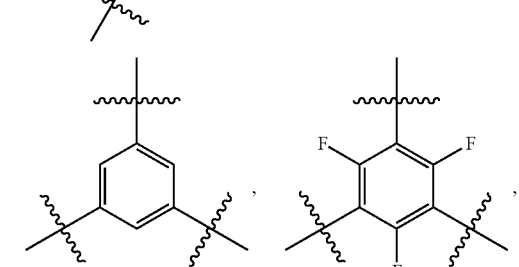
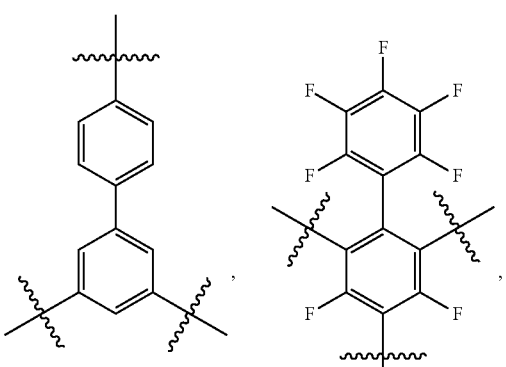
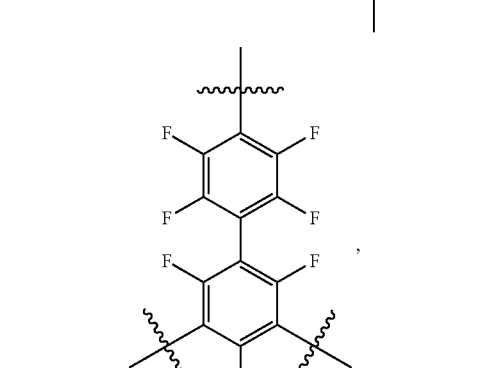
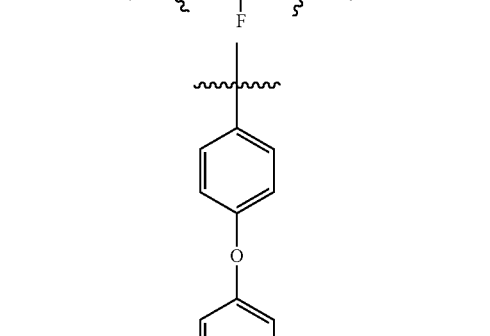
According to an exemplary embodiment of the present application, the repeating unit of Chemical Formula A may be represented by the following structural formula.
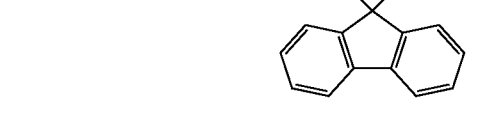
In the structural formula, m is the same as that as described above.

According to an exemplary embodiment of the present application, the repeating unit of Chemical Formula B may be represented by the following structural formulae.

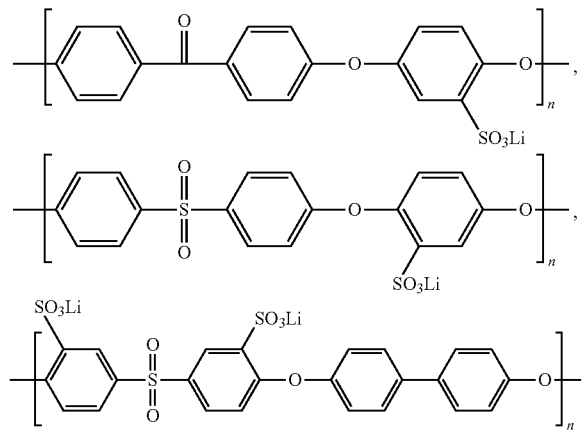

In the structural formulae, n is the same as that as described above.

According to an exemplary embodiment of the present specification, the copolymer may have a weight average molecular weight of 100,000 or more and 1,000,000 or less. When the weight average molecular weight of the copolymer is within the range, an appropriate solubility of the copolymer may be maintained while having mechanical properties as a protective layer.

According to an exemplary embodiment of the present specification, the lithium ion conductive protective layer may have a thickness of 0.01 to 50 µm, specifically 0.1 to 10 µm. The smaller the thickness of the lithium ion conductive protective layer is, the more advantageous output characteristics of the battery are, but dendrites may be blocked from being grown only when the lithium ion conductive protective layer is formed to have a predetermined thickness or more. When the thickness of the lithium ion conductive protective layer is within the range, lithium dendrites may be blocked from being grown while preventing output characteristics of the battery from excessively deteriorating.

According to an exemplary embodiment of the present specification, method typically used in the art may be used without limitation as a method of forming the lithium ion conductive protective layer. For example, it is possible to use a general method of forming a layer, such as a tape casting method, a dip coating method, a spray coating method, spin coating, a sputtering method of physical vapor deposition (PVD), and an atomic layer deposition (ALD) method of chemical vapor deposition (CVD).

According to an exemplary embodiment of the present application, the lithium electrode may have a thickness of 250 µm or less. Specifically, the lithium electrode may have a thickness of 200 µm or less.

According to an exemplary embodiment of the present application, the lithium electrode may have a thickness of 10 µm or more. Specifically, the lithium electrode may have a thickness of 50 µm or more.

When the thickness of the lithium electrode is within the range, there is an effect of improving the performance of the battery because the energy density per the volume of the battery is increased, and it is appropriate to apply to the battery.

In the present specification, when the lithium electrode does not include a protective layer, the 'thickness' of the porous carbon body may mean a thickness of the lithium electrode. That is, since the electrode has a structure in which lithium is inserted into the porous carbon body, the thickness of the porous carbon body including pores of the porous carbon body and lithium may be the thickness of the lithium electrode.

According to an exemplary embodiment of the present application, when the lithium electrode does not include a protective layer, the lithium electrode may have a thickness of 200 µm or less. Specifically, the lithium electrode may have a thickness of 150 µm or less.

Further, the present application provides a lithium secondary battery including a positive electrode, a negative electrode, and an electrolyte, in which the negative electrode is the above-described lithium electrode.

According to an exemplary embodiment of the present application, the positive electrode may be composed of a positive electrode current collector and a positive electrode active material layer applied on one surface or both surfaces thereof. Here, non-limiting examples of the positive electrode current collector include a foil prepared by aluminum, nickel or a combination thereof, and the like.

According to an exemplary embodiment of the present application, a positive electrode active material included in the positive electrode active material layer may be any one or a mixture of two or more selected from a group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (M1 and M2 are each independently any one selected from a group consisting of Al, Ni, Co, Fe, Mn, V, Cr, Ti, W, Ta, Mg, and Mo, and x, y, and z are each independently an atomic fraction of oxide composition elements, and $0 \leq x < 0.5$, $0 \leq y \leq 0.5$, $0 \leq z < 0.5$, and $x+y+z \leq 1$).

According to an exemplary embodiment of the present application, the lithium secondary battery may further include a separation membrane between the positive electrode and the negative electrode.

The separation membrane may be formed of a porous base material, and the porous base material may be used without limitation as long as the porous base material is a porous base material typically used in the electrochemical device, and for example, a polyolefin-based porous membrane or a nonwoven fabric may be used, but the separation membrane is not particularly limited thereto.

The polyolefin-based porous membrane may be a membrane formed by using polyethylene such as high density polyethylene, linear low density polyethylene, low density polyethylene, and ultrahigh molecular weight polyethylene, and a polyolefin-based polymer such as polypropylene, polybutylene, and polypentene, either alone or a polymer prepared from a mixture thereof.

Examples of the nonwoven fabric include a nonwoven fabric formed by using each of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalene, and the like either alone, or a polymer prepared from a mixture thereof. The structure of the nonwoven fabric may be a spunbond nonwoven fabric composed of long fibers or a melt-blown nonwoven fabric.

According to an exemplary embodiment of the present application, the thickness of the porous base material is not particularly limited, but may be 1 µm to 100 µm or 5 µm to 50 µm.

According to an exemplary embodiment of the present application, the size and porosity of pores present in the porous base material are also not particularly limited, but may be 0.001 μm to 50 μm and 10% to 95%, respectively.

According to an exemplary embodiment of the present application, the electrolyte may include an organic solvent and an electrolyte salt.

The electrolyte salt may be a lithium salt. As the lithium salt, those typically used in an electrolyte for a lithium secondary battery may be used without limitation. For example, an anion of the lithium salt may be any one selected from a group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

As the organic solvent, those typically used in the electrolyte for a lithium secondary battery may be used without limitation, and for example, ether, ester, amide, linear carbonate, cyclic carbonate, and the like may be each used either alone or in combination of two or more thereof. Specifically, the organic solvent may include cyclic carbonate, linear carbonate, or a carbonate compound which is a mixture thereof.

As an ether among the organic solvents, it is possible to use any one or a mixture of two or more selected from a group consisting of dimethyl ether, diethyl ether, dipropyl ether, methyl ethyl ether, methyl propyl ether, and ethyl propyl ether, but the ether is not limited thereto.

As an ester among the organic solvents, it is possible to use any one or a mixture of two or more selected from a group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, but the ester is not limited thereto.

Specific example of the cyclic carbonate compound include any one or a mixture of two or more selected from a group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, and halogenides thereof. Examples of the halogenides thereof include fluoroethylene carbonate (FEC), and the like, and are not limited thereto.

In particular, ethylene carbonate and propylene carbonate, which are a cyclic carbonate among the carbonate-based organic solvents, are a high-viscosity organic solvent, and may even more dissociate a lithium salt in the electrolyte due to high permittivity, and when a low-viscosity and low permittivity linear carbonate such as dimethyl carbonate and diethyl carbonate is mixed with the cyclic carbonate at a suitable ratio and a mixture is used, an electrolyte having a much higher electric conductivity may be made.

As a specific example of the linear carbonate compound, it is possible to representatively use any one or a mixture of two or more selected from a group consisting of dimethyl carbonate (DMC), diethyl carbonate (DEC), dipropyl carbonate, ethyl methyl carbonate (EMC), methyl propyl carbonate, and ethyl propyl carbonate, but the example is not limited thereto.

MODE FOR INVENTION

Hereinafter, the present application will be described in more detail through Examples. However, the following Examples are provided for exemplifying the present application, and the scope of the present application is not limited thereby.

EXAMPLE 1

A battery was prepared by using a positive electrode including 95 wt. % of $LiCoO_2$ as a positive electrode active material, 2.5 wt. % of Super-P as a conductive material, and 2.5 wt. % of polyvinylidene fluoride (PVDF) as a binder;

a negative electrode which is a lithium electrode in which a lithium metal (40 wt. % compared to the total content of a carbon paper and a lithium metal) is inserted into the carbon paper (thickness 100 μm, porosity 90%, manufactured by Toray Co., Ltd.) which is a porous carbon body; and an electrolytic solution of 1 M $LiPF_6$, EC/EMC=3:7 (vol. ratio).

EXAMPLE 2

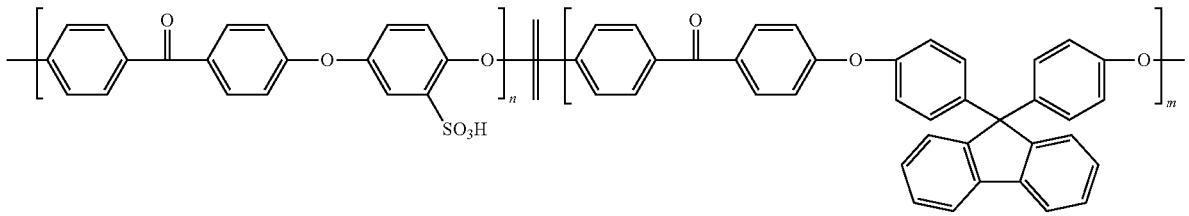

A battery was prepared in the same manner as in Example 1, except that a lithium ion conductive protective layer was formed to have a thickness of 5 μm on a lithium electrode by using a lithiated polyarylene ether copolymer having a sulfonic acid group including the structural formula in Example 1.

EXAMPLE 3

A battery was prepared in the same manner as in Example 2, except that the content of the lithium metal was made to be 90 wt. % compared to the total content of the carbon paper and the lithium metal in Example 2.

EXAMPLE 4

A battery was prepared in the same manner as in Example 2, except that a carbon paper having a porosity of 50% was used in Example 2.

EXAMPLE 5

A battery was prepared in the same manner as in Example 2, except that a carbon paper having a thickness of 200 μm was used in Example 2.

EXAMPLE 6

A battery was prepared in the same manner as in Example 1, except that a lithium ion conductive protective layer was formed to have a thickness of 5 μm on a lithium electrode by using poly(vinylidene fluoride-co-hexafluoropropylene) (PVDF-HFP) in Example 1.

EXAMPLE 7

A battery was prepared in the same manner as in Example 2, except that a thickness of a lithiated polyarylene ether copolymer having a sulfonic acid group was made to be 20 μm in Example 2.

EXAMPLE 8

A battery was prepared in the same manner as in Example 2, except that a thickness of a lithiated polyarylene ether copolymer having a sulfonic acid group was made to be 1 μm in Example 2.

COMPARATIVE EXAMPLE 1

A battery was prepared in the same manner as in Example 1, except that a lithium metal foil was used as a negative electrode in Example 1.

COMPARATIVE EXAMPLE 2

A battery was prepared in the same manner as in Comparative Example 1, except that a lithium ion conductive protective layer was formed to have a thickness of 5 μm on a lithium metal foil by using a lithiated polyarylene ether copolymer having a sulfonic acid group in Comparative Example 1.

EXPERIMENTAL EXAMPLE

The battery short-circuit time points were measured by 0.5C/0.5C charging/discharging the batteries prepared in Examples 1 to 8 and Comparative Examples 1 and 2, and the results are shown in the following Table 1.

TABLE 1

|  | Number of Battery Short-Circuit Cycles |
|---|---|
| Example 1 | 220 |
| Example 2 | 312 |
| Example 3 | 205 |
| Example 4 | 155 |
| Example 5 | 157 |
| Example 6 | 230 |
| Example 7 | 110 |
| Example 8 | 249 |
| Comparative Example 1 | 134 |
| Comparative Example 2 | 151 |

As shown in Table 1, it can be confirmed that Example 1 in which the lithium electrode according to an exemplary embodiment of the present application was used had a more delayed battery short-circuit time point than Comparative Example 1 where the lithium metal foil was used as the negative electrode and Comparative Example 2 where the lithium electrode in which the lithium ion conductive protective layer was formed on the lithium metal foil was used as the negative electrode. In particular, in the case of Example 2 where the lithium electrode further including the lithium ion conductive protective layer was used, a high performance may be exhibited because a battery short-circuit time point was further delayed. This is because the lithium electrode including the protective layer according to an exemplary embodiment of the present application prevents a phenomenon in which the protective layer was peeled off even when the battery was driven, thereby blocking the short circuit of the battery.

Further, it can be confirmed that when the porosity of the porous carbon body is too low or the thickness thereof is large, the balance between lithium active materials is not established, and accordingly, it is difficult to increase the efficiency, and when the thickness of the protective layer is large, the efficiency is reduced by cell resistance.

Therefore, the lithium battery including the lithium electrode according to an exemplary embodiment of the present application may prevent lithium dendrites and prevent a short circuit of the battery, thereby exhibiting high efficiency.

EXPLANATION OF REFERENCE NUMERALS AND SYMBOLS 10, 100, 101: Lithium electrode
11: Current collector
12: Lithium foil
13, 130: Lithium ion conductive protective layer
110: Porous carbon body
120: Lithium metal

The invention claimed is:

1. A lithium electrode comprising:
   a porous carbon body,
      wherein the porous carbon body is in a form of a mesh, a foam, or a paper;
   a lithium metal inserted into pores of the porous carbon body; and
   a lithium ion conductive protective layer,
      wherein the lithium ion conductive protective layer is in direct contact with at least one surface of the porous carbon body.

2. The lithium electrode of claim 1, wherein a content of the lithium metal is 1 to 80 wt % based on a total weight of the porous carbon body and the lithium metal.

3. The lithium electrode of claim 1, wherein the porous carbon body comprises at least one selected from activated carbon, graphite, graphene, carbon nanotubes (CNTs), carbon fiber, carbon black, and carbon aerosol.

4. The lithium electrode of claim 1, wherein the porous carbon body has a porosity of 50 to 99%.

5. The lithium electrode of claim 1, wherein the pores have an average particle diameter of 5 to 500 μm.

6. The lithium electrode of claim 1, wherein the porous carbon body has a thickness of 200 μm or less.

7. The lithium electrode of claim 1, wherein the lithium ion conductive protective layer comprises a material having a lithium ion conductivity of $10^{-7}$ S/cm or more.

8. The lithium electrode of claim 1, wherein the lithium ion conductive protective layer comprises at least one selected from inorganic compounds and organic compounds.

9. The lithium electrode of claim 8, wherein the inorganic compound is any one or a mixture of two or more selected from a group consisting of LiPON, hydride-based compounds, thio-LISICON-based compounds, NASICON-based compounds, LISICON-based compounds, and Perovskite-based compounds.

10. The lithium electrode of claim 8, wherein the organic compound is selected from polyethylene oxide (PEO); polyacrylonitrile (PAN); polymethylmethacrylate (PMMA); polyvinylidene fluoride (PVDF); and a polymer comprising —$SO_3Li$, —COOLi, or —OLi.

11. The lithium electrode of claim 1, wherein the lithium ion conductive protective layer has a thickness of 0.01 μm to 5 μm.

12. The lithium electrode of claim 1, wherein the lithium electrode has a thickness of 250 μm or less.

13. A lithium secondary battery comprising:
a positive electrode;
a negative electrode; and
an electrolyte,
wherein the negative electrode is the lithium electrode of claim 1.

14. The lithium secondary battery of claim 13, wherein the positive electrode comprises a positive electrode active material which is any one or a mixture of two or more selected from a group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (M1 and M2 are each independently any one selected from a group consisting of Al, Ni, Co, Fe, Mn, V, Cr, Ti, W, Ta, Mg, and Mo, and x, y, and z are each independently an atomic fraction of oxide composition elements, and $0 \leq x < 0.5$, $0 \leq y < 0.5$, $0 \leq z < 0.5$, and $x+y+z \leq 1$).

15. The lithium secondary battery of claim 13, wherein the electrolyte comprises an organic solvent and an electrolyte salt.

16. The lithium secondary battery of claim 15, wherein the organic solvent is any one or a mixture of two or more selected from a group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, fluoroethylene carbonate (FEC), dimethyl carbonate (DMC), diethyl carbonate (DEC), dipropyl carbonate, ethyl methyl carbonate (EMC), methyl propyl carbonate, ethyl propyl carbonate, dimethyl ether, diethyl ether, dipropyl ether, methyl ethyl ether, methyl propyl ether, ethyl propyl ether, methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone.

17. The lithium secondary battery of claim 15, wherein the electrolyte salt comprises any one or two or more selected from a group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

* * * * *